United States Patent
Ohgami et al.

(10) Patent No.: US 10,158,132 B2
(45) Date of Patent: Dec. 18, 2018

(54) FUEL CELL SYSTEM AND METHOD OF CONTROLLING THE FUEL CELL SYSTEM

(71) Applicant: HONDA MOTOR CO., LTD., Tokyo (JP)

(72) Inventors: Osamu Ohgami, Utsunomiya (JP); Kenichiro Ueda, Utsunomiya (JP); Koichiro Miyata, Saitama (JP); Jumpei Ogawa, Wako (JP); Takashi Yamamoto, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 798 days.

(21) Appl. No.: 14/024,870

(22) Filed: Sep. 12, 2013

(65) Prior Publication Data

US 2014/0080018 A1 Mar. 20, 2014

(30) Foreign Application Priority Data

Sep. 14, 2012 (JP) ................................. 2012-202917

(51) Int. Cl.
*H01M 8/04492* (2016.01)
*H01M 8/04746* (2016.01)
(Continued)

(52) U.S. Cl.
CPC ....... *H01M 8/04604* (2013.01); *H01M 8/045* (2013.01); *H01M 8/04097* (2013.01);
(Continued)

(58) Field of Classification Search
CPC ............... H01M 8/04; H01M 8/04291; H01M 8/04492; H01M 8/04798; H01M 8/04388;
(Continued)

(56) References Cited

U.S. PATENT DOCUMENTS 6,562,501 B1 * 5/2003 Nagamiya .......... H01M 8/04119
429/413
2002/0182461 A1 * 12/2002 Hasuka ............... B60L 11/1881
429/431

(Continued)

FOREIGN PATENT DOCUMENTS

| DE | 11 2009 005 151 T5 | 6/2012 |
|---|---|---|
| JP | 2007-165186 A | 6/2007 |
| JP | 2009-146675 A | 7/2009 |

OTHER PUBLICATIONS

German Search Report application No. 10 2013 2180144.2 dated Aug. 7, 2014.

*Primary Examiner* — Christina Chern
(74) *Attorney, Agent, or Firm* — Squire Patton Boggs (US) LLP

(57) ABSTRACT

A fuel gas supply apparatus of a fuel cell system includes a pressure reducing valve, an interruption valve, and an injector in a hydrogen supply channel. A controller of the fuel cell system includes a drive cycle setting unit for setting the drive cycle of the injector based on a load of the fuel cell stack, and a water state determination unit for determining whether or not quantity of water content in the fuel cell is excessive by determining whether or not the quantity of water content is a predetermined quantity or more.

3 Claims, 12 Drawing Sheets

(51) Int. Cl.
  *H01M 8/04537* (2016.01)
  *H01M 8/04089* (2016.01)
  *H01M 8/1018* (2016.01)

(52) U.S. Cl.
  CPC ... *H01M 8/04619* (2013.01); *H01M 8/04753* (2013.01); *H01M 2008/1095* (2013.01)

(58) Field of Classification Search
  CPC ......... H01M 8/04119; H01M 8/04179; H01M 8/045
  See application file for complete search history.

(56) References Cited

U.S. PATENT DOCUMENTS

| | | | |
|---|---|---|---|
| 2003/0180599 A1* | 9/2003 | Kamihara | H01M 8/04097 429/415 |
| 2009/0013051 A1 | 5/2009 | Ishikawa et al. | |
| 2012/0141899 A1 | 6/2012 | Yamanaka et al. | |

\* cited by examiner

FUEL CELL SYSTEM AND METHOD OF CONTROLLING THE FUEL CELL SYSTEM

CROSS-REFERENCE TO RELATED APPLICATION

This application is based upon and claims the benefit of priority from Japanese Patent Application No. 2012-202917 filed on Sep. 14, 2012, the contents of which are incorporated herein by reference.

BACKGROUND OF THE INVENTION

Field of the Invention

The present invention relates to a fuel cell system including a fuel cell for generating electrical energy by electrochemical reactions of an oxygen-containing gas and a fuel gas, an oxygen-containing gas supply apparatus for supplying the oxygen-containing gas, a fuel gas supply apparatus for supplying the fuel gas, and a control device. Further, the present invention relates to a method of controlling the fuel cell system.

Description of the Related Art

In general, a fuel cell is a system for obtaining direct current electrical energy by electrical chemical reactions of a fuel gas (gas chiefly containing hydrogen such as a hydrogen gas) supplied to an anode of the fuel cell and an oxygen-containing gas (gas chiefly containing oxygen such as air) supplied to a cathode of the fuel cell. This system is used in stationary applications. Further, the system is provided in fuel cell operated electric vehicles for use in in-vehicle applications.

For example, a solid polymer electrolyte fuel cell employs an electrolyte membrane. The electrolyte membrane is a polymer ion exchange membrane, and interposed between an anode and a cathode to form a membrane electrode assembly (MEA). The membrane electrode assembly and a pair of separators sandwiching the membrane electrode assembly make up a power generation cell for generating electricity. In use, typically, a predetermined number of the power generation cells are stacked together to form a fuel cell stack, e.g., mounted in a vehicle.

In this regard, as a fuel gas supply apparatus for supplying a fuel gas to a fuel cell, a fuel cell system having an injector is adopted. For example, it is known that a technique of this type is disclosed in Japanese Laid-Open Patent Publication No. 2009-146675, entitled "FUEL CELL SYSTEM AND ACTUATION METHOD OF INJECTOR".

This actuation method is applied to a fuel cell system including a fuel cell for generating electrical energy by electrochemical reactions of a fuel gas and an oxygen-containing gas, a pressure regulator valve for regulating the pressure of the fuel gas supplied from a fuel supply source to the fuel cell, and a plurality of injectors for regulating the state of the fuel gas supplied to the fuel cell and having different allowable upper limit values of the fuel pressure, and a pressure sensor for detecting the pressure of the fuel gas between the regulator valve and the injectors.

In a control step of this actuation method, when an instruction for starting operation of the fuel cell system is received, in the case where the pressure of the fuel gas detected by the pressure sensor has a predetermined pressure value or more, at least one of the injectors among injectors having allowable upper limit values equal to or more than the predetermined pressure value is actuated.

According to the disclosure, in this manner, it becomes possible to open the valves of only the injectors that are highly likely to be actuated. Further, it is possible to prohibit actuation of the injectors that cannot be actuated because the allowable upper limit values of the fuel pressure are less than the pressure of the fuel gas.

SUMMARY OF THE INVENTION

In Japanese Laid-Open Patent Publication No. 2009-146675, in the case where the detected hydrogen gas pressure has a predetermined pressure value or more, i.e., during low load operation, only the injector having the higher allowable upper limit value of the fuel pressure, i.e., only the injector having the small flow rate of the hydrogen gas which can be supplied (small flow rate injector) is actuated, and the valve of the injector is opened.

However, after high load operation continued for a certain period of time, in the case where operation switched to low load operation, it is highly probable that a large quantity of stagnant water is present. Therefore, in the small flow rate injector, since the quantity of injected hydrogen gas is small, the performance of discharging the water is lowered, and the large quantity of the stagnant water cannot be discharged. Thus, the power generation performance of the fuel cell is lowered, and it becomes difficult to maintain the desired power generation state.

The present invention has been made to solve the problem of this type, and an object of the present invention is to provide a fuel cell system and a method of controlling the fuel cell system in which stagnant water remaining in a fuel gas channel can be discharged simply and reliably, and the desired power generation performance can be maintained.

The present invention relates to a fuel cell system including a fuel cell having a cathode and an anode for generating electrical energy by electrochemical reactions of an oxygen-containing gas supplied to the cathode and a fuel gas supplied to the anode, an oxygen-containing gas supply apparatus for supplying the oxygen-containing gas to the fuel cell, a fuel gas supply apparatus for supplying the fuel gas to the fuel cell, and a control device. Further, the present invention relates to a method of controlling the fuel cell system.

In the fuel cell system, the fuel gas supply apparatus includes a fuel gas supply pipe for supplying the fuel gas to the anode of the fuel cell, a fuel gas discharge pipe for discharging the fuel gas from the anode of the fuel cell, and a fuel gas supply unit provided in the fuel gas supply pipe for injecting the fuel gas at every set drive cycle.

The control device includes a drive cycle setting unit for setting the drive cycle of the fuel gas supply unit based on a load of the fuel cell, and a water state determination unit for determining whether or not quantity of water content in the fuel cell is excessive by determining whether or not the quantity of water content is a predetermined quantity or more. When the water state determination unit determines that the quantity of the water content is excessive, the drive cycle setting unit sets the drive cycle for injecting the fuel gas to be longer than a drive cycle used during normal operation.

Further, the control method includes the step of supplying the fuel gas to the anode of the fuel cell from the fuel gas supply apparatus by injection at every drive cycle set based on a load of the fuel cell, determining whether or not quantity of water content in the fuel cell is excessive by determining whether or not the quantity of water content is a predetermined quantity or more, and when the quantity of the water content is determined as excessive, setting the drive cycle for injecting the fuel gas to be longer than a drive cycle used during normal operation.

In the present invention, in the case where the water content in the fuel cell is excessive, a long drive cycle for injecting the fuel gas to the fuel cell is set, and a large quantity of fuel gas is set for one injection. Therefore, the stagnant water remaining in the fuel gas channel of the fuel cell can be discharged simply and reliably, and it becomes possible to maintain the desired power generation performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
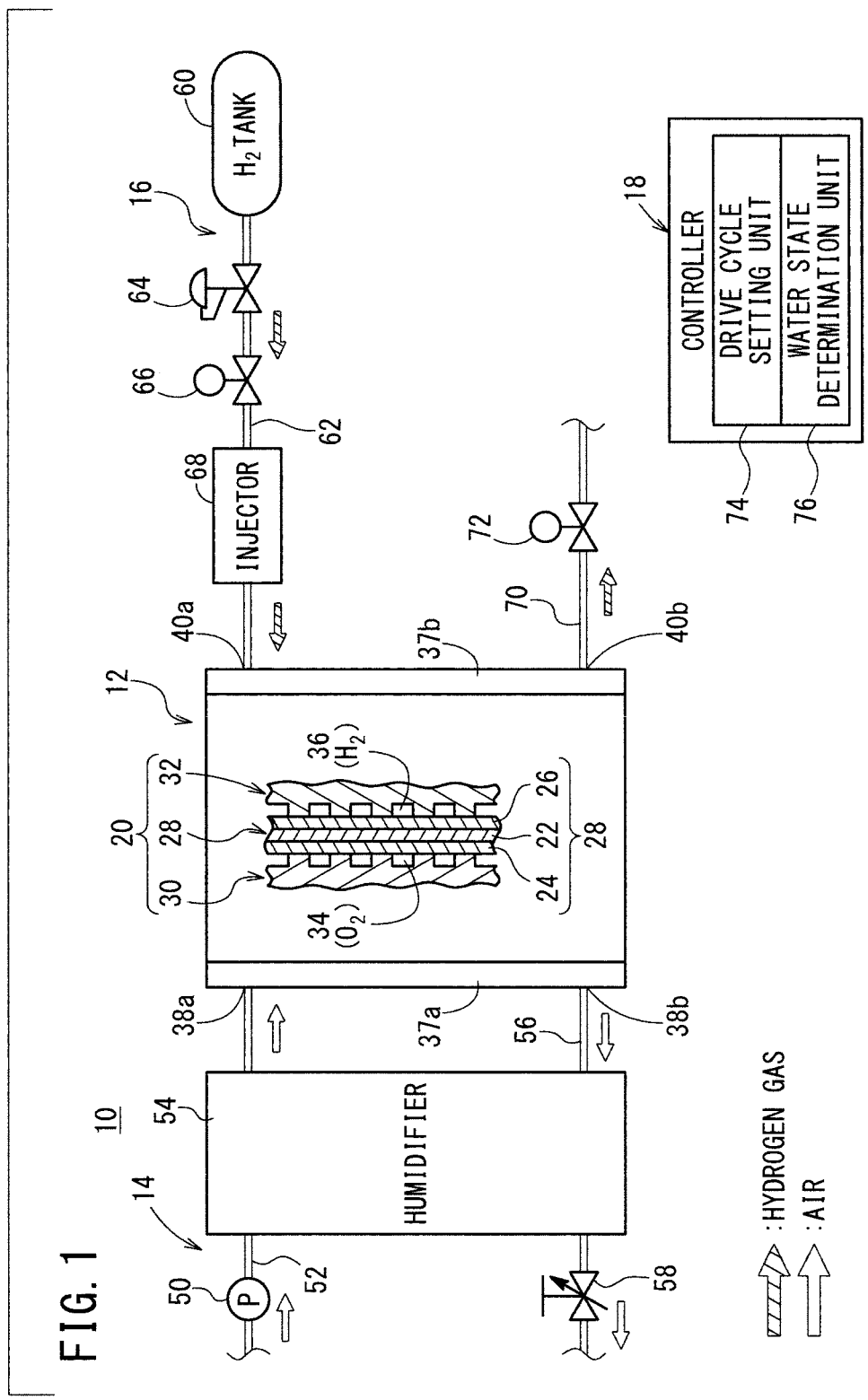
FIG. 1 is a diagram schematically showing structure of a fuel cell system according to a first embodiment of the present invention.

As shown in FIG. 1, a fuel cell system 10 according to a first embodiment of the present invention includes a fuel cell stack 12, an oxygen-containing gas supply apparatus 14 for supplying an oxygen-containing gas to the fuel cell stack 12, a fuel gas supply apparatus 16 for supplying a fuel gas to the fuel cell stack 12, and a controller (control device) 18 for controlling the entire fuel cell system 10. For example, the fuel cell system 10 is mounted in a fuel cell vehicle (not shown) such as a fuel cell electric automobile.

The fuel cell stack 12 is formed by stacking a plurality of fuel cells 20 together. Each of the fuel cells 20 includes a membrane electrode assembly (MEA) 28. The membrane electrode assembly 28 includes a cathode 24, an anode 26, and a solid polymer electrolyte membrane 22 interposed between the cathode 24 and the anode 26. For example, the solid polymer electrolyte membrane 22 is a fluorine based electrolyte membrane or a hydrocarbon based electrolyte membrane.

Each of the cathode 24 and the anode 26 includes a gas diffusion layer made of a carbon paper or the like, and an electrolyte catalyst layer of porous carbon particles supporting platinum alloy (or Ru, etc.) on their surfaces. The carbon particles are deposited uniformly on the surfaces of the gas diffusion layer of the cathode 24 and the gas diffusion layer of the anode 26. The electrode catalyst layer of the cathode 24 and the electrode catalyst layer of the anode 26 are fixed to both surfaces of the solid polymer electrolyte membrane 22, respectively.

The fuel cell 20 is formed by sandwiching the membrane electrode assembly 28 between a cathode side separator 30 and an anode side separator 32. For example, the cathode side separator 30 and the anode side separator 32 are carbon separators or metal separators.

An oxygen-containing gas flow field 34 is provided between the cathode side separator 30 and the membrane electrode assembly 28, and a fuel gas flow field 36 is provided between the anode side separator 32 and the membrane electrode assembly 28.

The fuel cell stack 12 includes end plates 37a, 37b at both ends of the fuel cells 20 in the stacking direction. A tightening load is applied to components between the end plates 37a, 37b in the stacking direction by tie-rods (not shown) or a casing or the like including the end plates 37a, 37b.

The end plate 37a has an oxygen-containing gas inlet manifold 38a for supplying an oxygen-containing gas (hereinafter also referred to as air) and an oxygen-containing gas outlet manifold 38b for discharging the oxygen-containing gas. The oxygen-containing gas inlet manifold 38a and the oxygen-containing gas outlet manifold 38b extend through the fuel cells 20 in the stacking direction.

The end plate 37b has a fuel gas inlet manifold 40a for supplying a fuel gas such as a hydrogen containing gas (hereinafter also referred to as hydrogen gas) and a fuel gas outlet manifold 40b for discharging the fuel gas. The fuel gas inlet manifold 40a and the fuel gas outlet manifold 40b extend through the fuel cells 20 in the stacking direction.

The oxygen-containing gas supply apparatus 14 includes an air pump 50 for compressing and supplying the atmospheric air. The air pump 50 is provided in an air supply channel (oxygen-containing gas supply channel) 52. A humidifier 54 is provided in the air supply channel 52 for exchange of the water content and heat between a supply gas (oxygen-containing gas supplied to the fuel cell stack 12) and a discharge gas (oxygen-containing gas discharged from the fuel cell stack 12). The air supply channel 52 is connected to the oxygen-containing gas inlet manifold 38a of the fuel cell stack 12.

The oxygen-containing gas supply apparatus 14 has an air discharge channel (oxygen-containing gas discharge channel) 56 connected to the oxygen-containing gas outlet manifold 38b. The air discharge channel 56 is connected to a humidifying medium channel (not shown) of the humidifier 54. A back pressure control valve 58 is provided in the air discharge channel 56. The opening angle of the back pressure control valve 58 is adjustable for regulating the pressure of the air supplied from the air pump 50 to the fuel cell stack 12 through the air supply channel 52.

The fuel gas supply apparatus 16 has a hydrogen tank 60 storing high pressure hydrogen. The hydrogen tank 60 is connected to the fuel gas inlet manifold 40a of the fuel cell stack 12 through a hydrogen supply channel (fuel gas supply pipe) 62.

A pressure reducing value 64, an interruption valve 66, and an electronically controlled injector (fuel gas supply unit) 68 are provided in the hydrogen supply channel 62. The injector 68 injects the hydrogen gas supplied from the hydrogen tank 60 cyclically, for supplying the hydrogen gas to the fuel cell stack 12 through the hydrogen supply channel 62. The fuel gas supply unit is not limited to the injector 68, and various devices can be used. This is also the case with a second embodiment described later.

An off gas channel (fuel gas discharge pipe) 70 is connected to the fuel gas outlet manifold 40b, and a purge valve 72 is connected to a certain position in the off gas channel 70.

The controller 18 has a drive cycle setting unit 74 for setting the drive cycle of the injector 68 based on the load of the fuel cell stack 12, and a water state determination unit 76 for determining whether or not the quantity of water content in the fuel cell stack 12 is a predetermined quantity or more (whether or not the quantity of water content in the fuel cell stack 12 is excessive).

Operation of the fuel cell system 10 will be described below.

Firstly, during operation of the fuel cell system 10, the air is supplied to the air supply channel 52 through the air pump 50 of the oxygen-containing gas supply apparatus 14. After the air is humidified while flowing through the humidifier 54, the air is supplied to the oxygen-containing gas inlet manifold 38a of the fuel cell stack 12. The air moves along the oxygen-containing gas flow field 34 provided in each of the fuel cells 20 of the fuel cell stack 12, and the air is supplied to the cathode 24.

The partially consumed air (discharge air) is discharged into the air discharge channel 56 through the oxygen-containing gas outlet manifold 38b. The discharge air is sent to the humidifier 54 to humidify the fresh air supplied through a water permeable membrane. Then, the discharge air is discharged through the back pressure control valve 58.

In the meanwhile, in the fuel gas supply apparatus 16, the interruption valve 66 is opened to cyclically supply the hydrogen gas from the hydrogen tank 60, having pressure reduced by the pressure reducing valve 64, to the hydrogen supply channel 62 by injection through the injector 68. This hydrogen gas flows through the hydrogen supply channel 62, and the hydrogen gas is supplied to the fuel gas inlet manifold 40a of the fuel cell stack 12. The hydrogen gas supplied into the fuel cell stack 12 moves along the fuel gas flow field 36 of each of the fuel cells 20, and the hydrogen gas is supplied to the anode 26.

The partially consumed hydrogen gas is discharged from the fuel gas outlet manifold 40b to the off gas channel 70. Then, the purge valve 72 is opened, and thus, the partially consumed hydrogen gas flows into a dilution box (not shown), for example.

Next, a method of controlling the fuel cell system 10 according to the first embodiment will be described below with reference to a flow chart shown in FIG. 2.

As described above, when operation of the fuel cell system 10 is performed, the controller 18 calculates the quantity of stagnant water in the fuel cell stack 12 (in the FC) (step S1).

Figure 3:
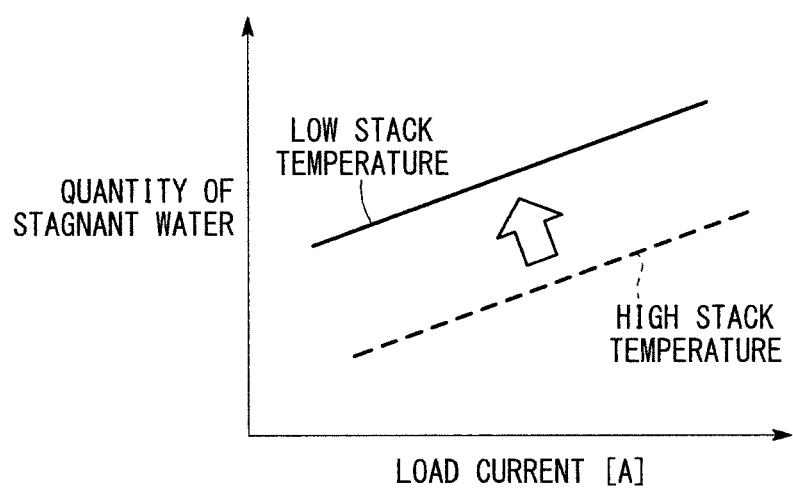
FIG. 3 is a graph showing the relationship among the load current, the stack temperature, and the quantity of stagnant water.

The quantity of the stagnant water can be calculated by integration based on the stagnant water rate map of the load current and the temperature in the fuel cell stack 12. As shown in FIG. 3, the stagnant water rate map shows a relationship where the quantity of the stagnant water increases in correspondence with the magnitude of the load current, and the quantity of the stagnant water increases as the decrease in the stack temperature. The quantity of the stagnant water can be calculated from this stagnant water rate map.

Further, instead of the stagnant water rate map, impedance of the fuel cell 20 may be measured, and the quantity of the stagnant water may be estimated from the impedance.

Then, the routine proceeds to step S2 to determine whether or not the quantity of the stagnant water in the fuel cell stack 12 is excessive (whether quantity of the water content is excessive). In step S2, the water state determination unit 76 determines whether or not the calculated quantity of the stagnant water exceeds a predetermined stagnant water threshold value. Further, the water state determination unit 76 determines whether or not the fuel cell stack 12 is operated at low load as necessary.

Further, if it is determined that the calculated quantity of the stagnant water exceeds the stagnant water quantity threshold value, the quantity of the stagnant water is determined as excessive (YES in step S2), and the routine proceeds to step S3.

In step S3, if it is determined that the anode pressure is more than a lower limit threshold value and less than an upper limit threshold value, i.e., if it is determined that pressure variation in the anode pressure is allowable (YES in step S3), the routine proceeds to step S4.

Figure 4:
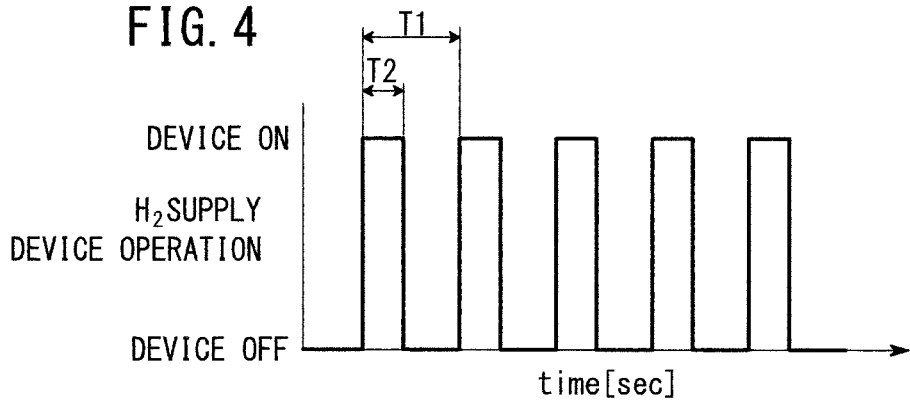
FIG. 4 is a graph showing the relationship between the interval for supplying a hydrogen gas and the injection time period during normal operation.
Figure 5:
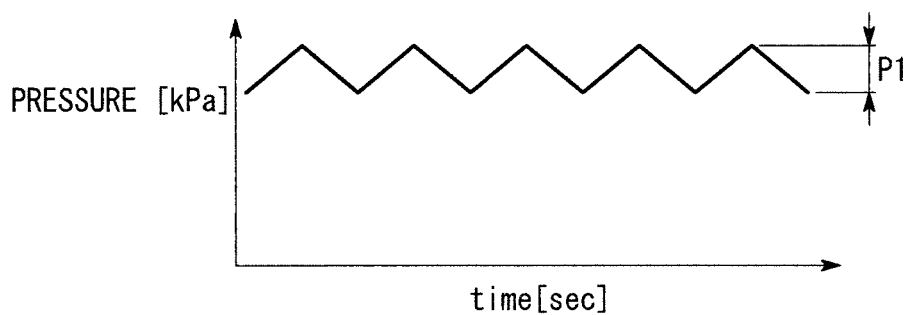
FIG. 5 is a graph illustrating the anode pressure during the normal operation.

In step S4, control in the stagnant water discharge mode is implemented. Specifically, under the control in the normal mode (normal mode control), the quantity of the injected hydrogen gas is set in correspondence with the load current. For example, as shown in FIG. 4, by turning on the injector 68 at every predetermined interval T1 for an ON time period T2, the quantity of the injected hydrogen gas at every interval T1 can be set. In this case, as shown in FIG. 5, the amplitude of the anode pressure (pressure in the anode channel system) is within an anode differential pressure P1.

Figure 6:
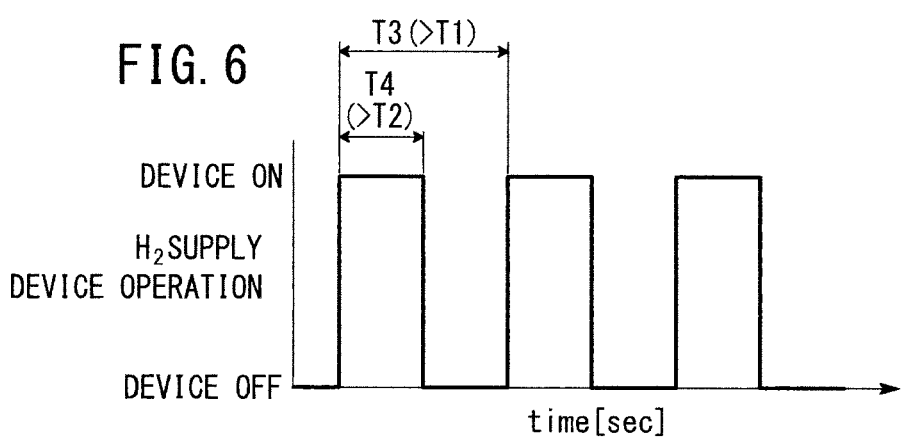
FIG. 6 is a graph showing the relationship between the interval for supplying the hydrogen gas and the injection time period during operation of discharging the stagnant water.
Figure 7:
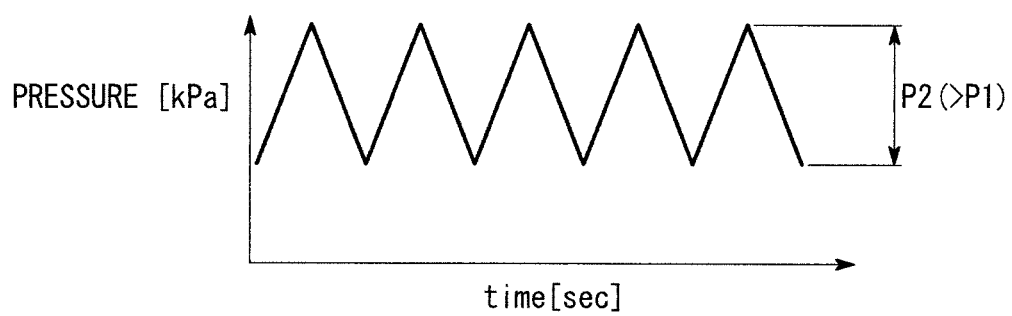
FIG. 7 is a graph illustrating the anode pressure during the operation of discharging the stagnant water.

In contrast, in the stagnant water discharge mode, as shown in FIG. 6, the quantity of the injected hydrogen is set by turning on the injector 68 at every interval T3 which is longer than an interval T1 used during normal operation, for an ON time period T4 which is longer than an ON time period T2 for setting the quantity of the injected hydrogen during normal operation. Therefore, the quantity of the injected hydrogen per one injection in this mode is larger than the quantity of the injected hydrogen per one injection during normal operation. Therefore, as shown in FIG. 7, the amplitude of the anode pressure is the anode differential pressure P2 which is larger than the anode differential pressure P1 during normal operation, and the time period in which the differential pressure is applied becomes long.

As described above, in the stagnant water discharge mode, the drive cycle (T3) for injecting the hydrogen gas is longer than the drive cycle (T1) used during normal operation, and the injection quantity of the hydrogen gas injected in every drive cycle (ON time period T4) is larger than the injection quantity during normal operation (ON time period T2).

Thus, in the stagnant water discharge mode, the anode differential pressure P2 which is larger than the differential pressure during normal operation is produced, and the time period in which the differential pressure is applied becomes long. Therefore, it becomes possible to reliably discharge the stagnant water remaining in the anode channel system in the fuel cell stack 12. In this case, the process of discharging the stagnant water can be performed using the map of the stagnant water discharge rate with respect to the anode differential pressure. Alternatively, the stagnant water discharge control can be implemented based on the estimated water quantity using impedance values.

In step S2, if it is determined that the quantity of the stagnant water is not excessive (NO in step S2), the routine proceeds to step S5 to supply the hydrogen gas by implementing the normal mode control. Likewise, if it is determined that the pressure variation is not allowable (NO in step S3), the routine proceeds to step S5 for implementing the normal mode control.

In the first embodiment, if it is determined that the quantity of the water content (quantity of the stagnant water) in the fuel cell stack 12 is excessive, the drive cycle for injecting the hydrogen gas supplied to the fuel cell stack 12 is set to be longer than the drive cycle used during normal operation, and the injection quantity of the hydrogen gas injected in every drive cycle is set to be larger than the injection quantity during normal operation.

In this manner, since the anode differential pressure in the anode channel system becomes large, and the time period in which the differential pressure is applied becomes long, the stagnant water remaining in the anode channel system can be discharged easily and reliably. Accordingly, it becomes possible to maintain the desired power generation performance in the fuel cell stack 12.

Further, if it is determined that the quantity of the stagnant water is excessive (step S2), an additional condition is provided to determine whether or not the fuel cell stack 12 is operated at low load. In this manner, since the stagnant water discharge mode is applied during the low load operation in which the quantity of water produced in power generation is small, the process of discharging the water can be performed more efficiently.

Further, in the first embodiment, in the stagnant water discharge mode, the control of opening/closing the purge valve 72 can be performed synchronously while the injector 68 is open (within the ON time period).

Figure 8:
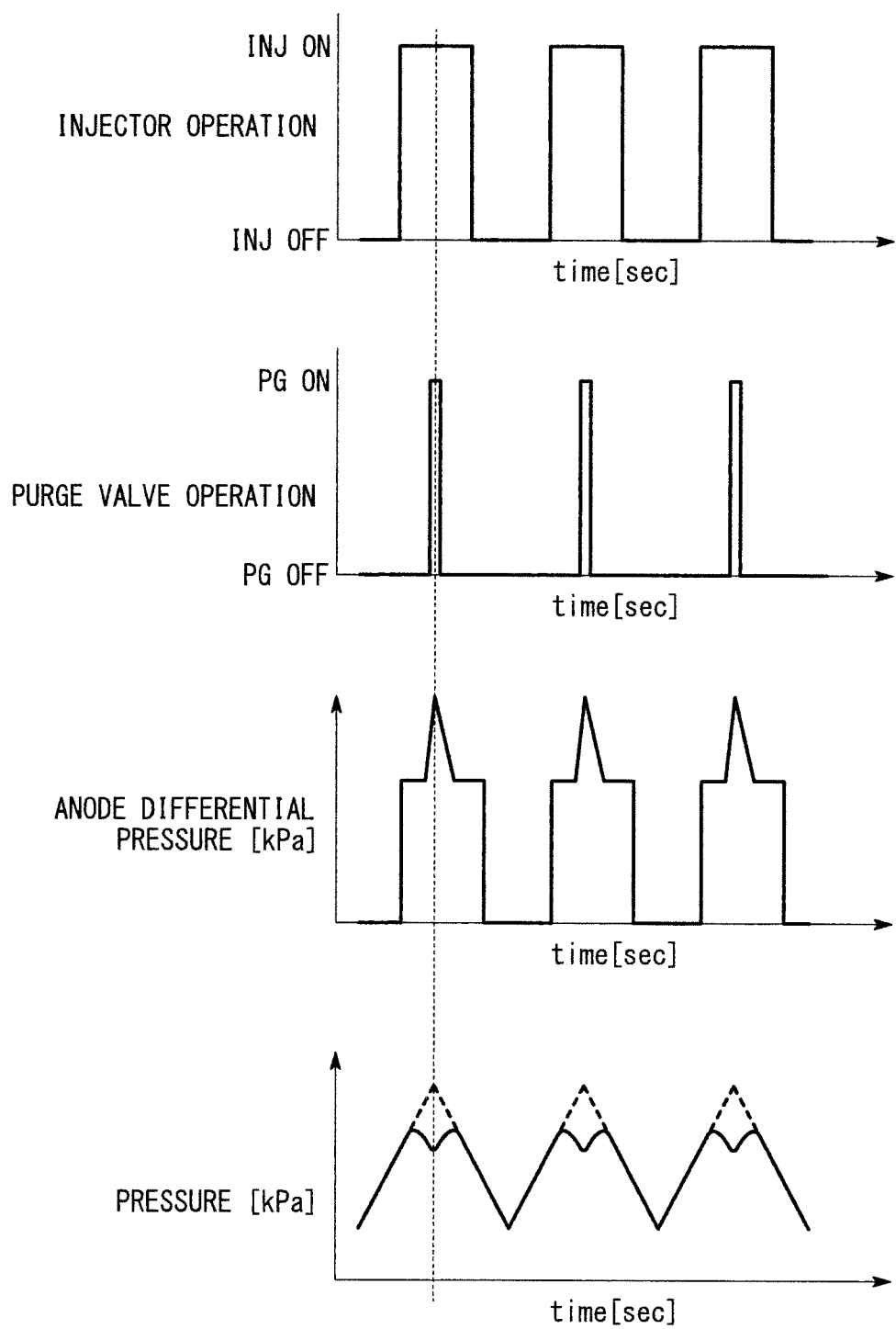
FIG. 8 is a timing chart illustrating ON/OFF control of an injector and ON/OFF control of a purge valve.

As shown in FIG. 8, while the injector 68 is turned on, the purge valve 72 is turned on temporarily. Thus, a large differential pressure between the inlet side and the outlet side of the fuel cell stack 12, i.e., the anode differential pressure is produced. Therefore, in comparison with the normal operation, the anode differential pressure becomes much larger, and the water can be discharged from the fuel cell stack 12 more rapidly and reliably.

In this case, by opening the purge valve 72, it is possible to suppress the instantaneous rise of the anode pressure when the injector 68 is turned on, and thus, the anode pressure does not exceed the upper limit threshold value of the anode pressure temporarily. It should be noted that the upper limit threshold value of the anode pressure is determined based on the differential pressure between the electrodes (cathode and anode) and durability of the devices of the fuel cell stack 12.

In the first embodiment, after the quantity of the stagnant water in the fuel cell stack 12 is calculated (step S1), it is determined whether or not the quantity of the stagnant water is excessive (step S2).

Alternatively, in the present invention, in the fuel cell system 10, after the high load operation at a predetermined high load threshold electrical current value or more continues for a predetermined period of time or more, if operation is switched to the low load operation at a predetermined low load threshold electrical current value or less, the quantity of the stagnant water in the fuel cell stack 12 may be determined as excessive. For example, in an embodiment, after high load operation at a predetermined high load threshold electrical current value or more continues a predetermined period of time or more, if operation is switched to low load operation at a predetermined low load threshold electrical current value or less, the quantity of the water content is determined as excessive.

In this manner, the water state determination unit 76 determines whether or not stagnation of water occurs in the high load operation. Therefore, even during the low load operation, it becomes possible to detect the state where the excessive stagnant water is present accurately.

Further, in the present invention, if elapsed time from starting start-up operation of the fuel cell system 10 is within a predetermined period of time, if the low load operation continues for a predetermined period of time, and if the quantity of water content calculated from impedance values is a predetermined quantity or more, the quantity of the stagnant in the fuel cell stack 12 may be determined as excessive. In this case, the start-up temperature of the fuel cell system 10 can be taken into consideration. For example, in an embodiment, if elapsed time from starting start-up operation of the fuel cell system is within a predetermined period of time, if the low load operation continues for a predetermined period of time, and if the quantity of water content calculated from impedance values of the fuel cell is a predetermined quantity or more, the quantity of the water content is determined as excessive.

In this manner, the water state determination unit 76 determines that the quantity of the stagnant water in the fuel cell stack 12 is excessive, in the case where a predetermined period of time has not elapsed after starting the start-up operation, and the system temperature is low to cause water condensation. Thus, further improvement in the performance of discharging the water is achieved.

Figure 9:
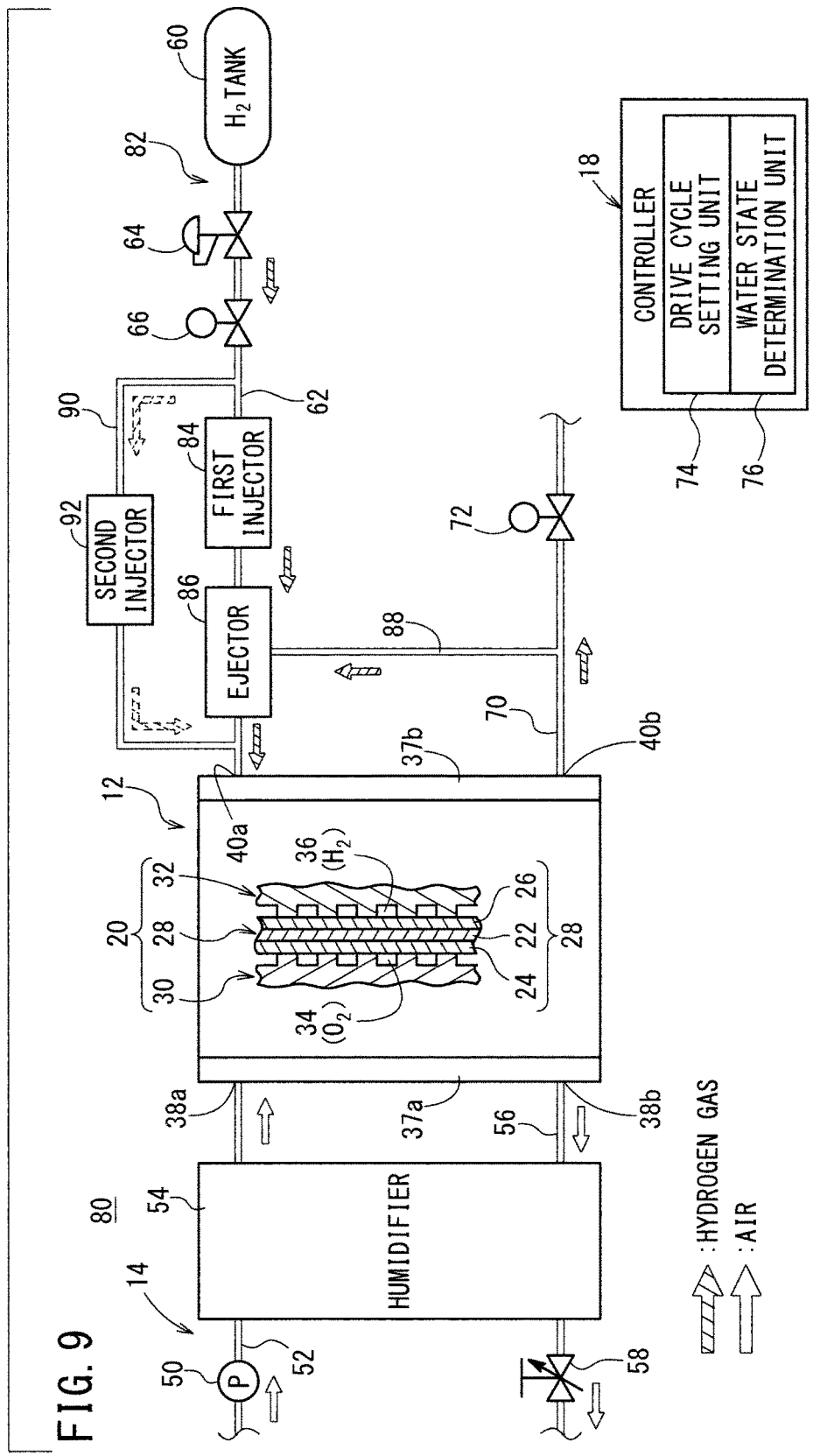
FIG. 9 is a diagram schematically showing structure of a fuel cell system according to a second embodiment of the present invention.

FIG. 9 is a diagram schematically showing structure of a fuel cell system 80 according to a second embodiment of the present invention. The constituent elements that are identical to those of the fuel cell system 10 according to the first embodiment are labeled with the same reference numerals, and descriptions thereof will be omitted.

The fuel cell system 80 includes a fuel gas supply apparatus 82. A pressure reducing valve 64, an interruption valve 66, a first injector (first fuel gas supply unit) 84, and an ejector 86 are provided in a hydrogen supply channel 62 of the fuel gas supply apparatus 82.

A hydrogen gas is supplied from a hydrogen tank 60 to the ejector 86, and the ejector 86 supplies the hydrogen gas to the fuel cell stack 12 through the hydrogen supply channel 62. Further, the ejector 86 sucks from a hydrogen circulation channel (return pipe) 88 an exhaust gas containing a hydrogen gas which has not been consumed in the fuel cell stack 12 to supply the exhaust gas as the fuel gas, again to the fuel cell stack 12. The hydrogen circulation channel 88 is connected to an off gas channel 70 at a position upstream of a purge valve 72.

Both ends of a bypass pipe 90 are connected to the hydrogen supply channel 62 bypassing the first injector 84 and the ejector 86. A second injector (second fuel gas supply unit) 92 is provided in the bypass pipe 90. The second injector 92 is configured as a device which can supply the fuel gas at a large flow rate in comparison with the first injector 84.

Figure 10:
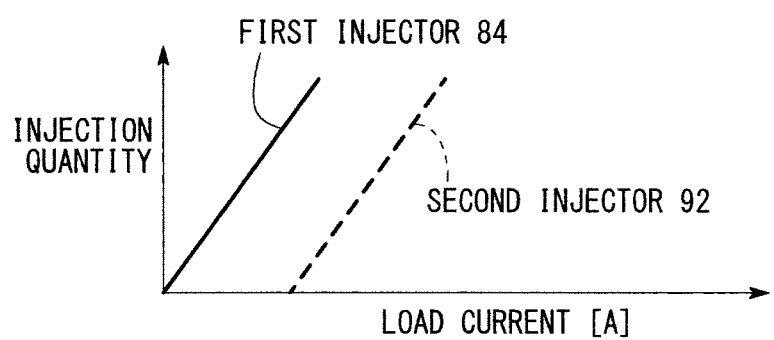
FIG. 10 is a graph showing the state where a first injector and a second injector are driven during normal operation.

In the fuel cell system 80, as shown in FIG. 10, during low load operation, only the first injector 84 as the small flow rate device is used to supply the hydrogen gas. When the load current increases to a predetermined threshold value or more, in addition to ON/OFF operation of the first injector 84, ON/OFF operation of the second injector 92 is started.

The first injector 84 and the second injector 92 have predetermined ON time periods, at predetermined intervals, respectively. The injection quantity of the first injector 84 and the injection quantity of the second injector 92 have the relationship between the load current and the injection quantity as shown in FIG. 10.

Figure 2:
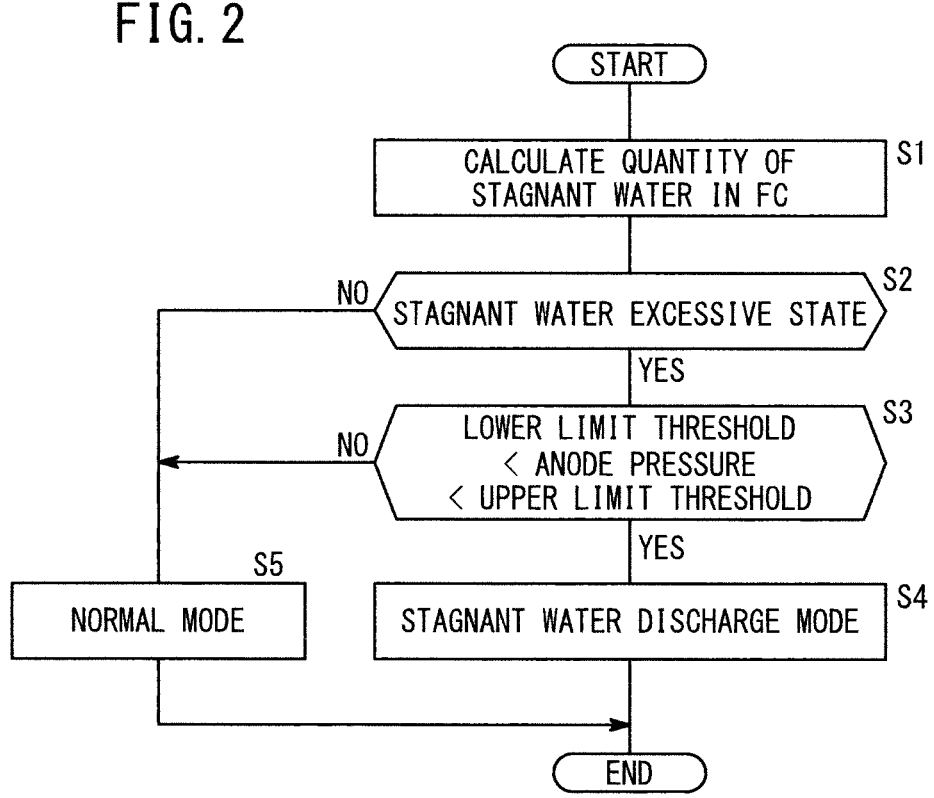
FIG. 2 is a flow chart illustrating a method of controlling the fuel cell system.
Figure 11:
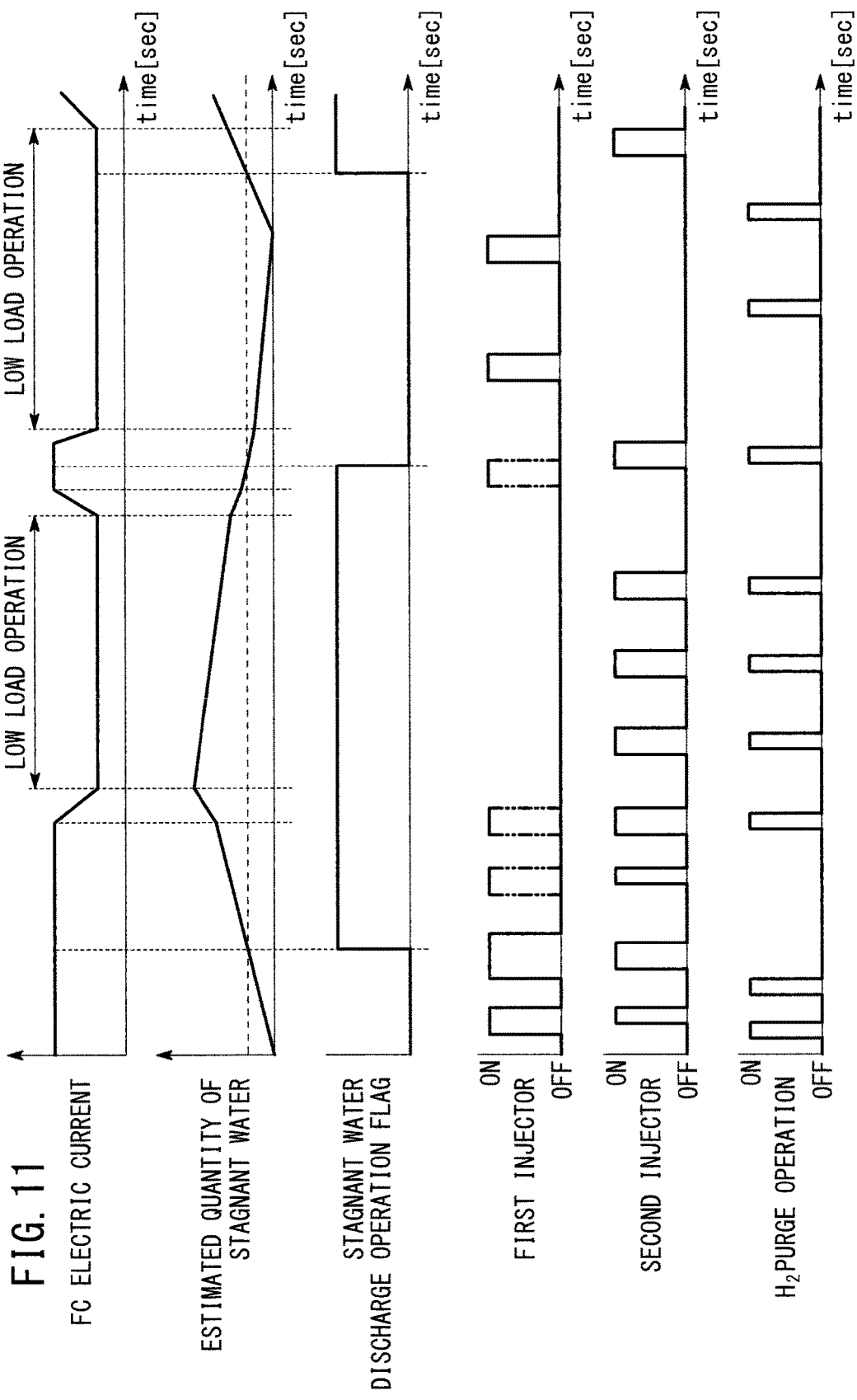
FIG. 11 is a timing chart illustrating a method of controlling the fuel cell system.

In effect, a method of controlling the fuel cell system 80 is carried out in accordance with the flow chart shown in FIG. 2, and the control is implemented in accordance with the time chart shown in FIG. 11. Specifically, depending on the load current, the first injector 84 and the second injector 92 are used in combination, or only the first injector 84 is driven to perform normal operation of the fuel cell stack 12. For example, during the high load operation, the second injector 92 is driven, and during the low load operation, the second injector 92 is not driven.

Figure 12:
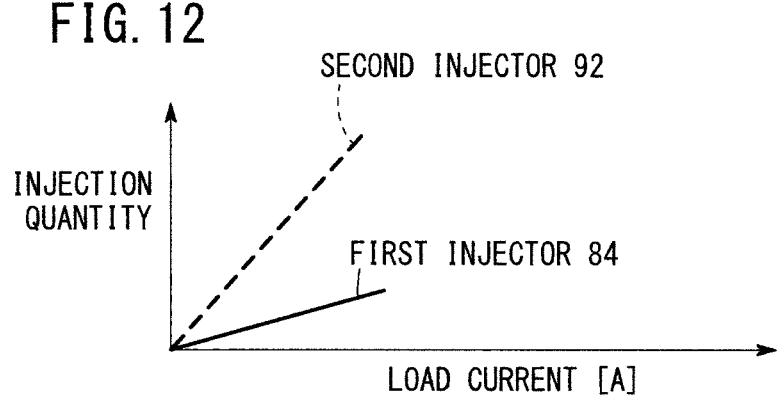
FIG. 12 is a graph showing the state where the first injector and the second injector are driven during operation of discharging stagnant water.

The controller 18 estimates the quantity of the stagnant water in the fuel cell stack 12. When the estimated quantity of the stagnant water exceeds a threshold value, i.e., when the controller 18 determines that the quantity of the stagnant water is excessive, a stagnant water discharge operation flag is set. Therefore, operation is switched to the stagnant water discharge mode. During the high load operation, the interval of the second injector 92 is extended to increase the anode differential pressure. At this time, the interval of the first injector 84 may not be extended (see two dotted chain lines in FIG. 11). It is because, since the second injector 92 having large pressure variation is used, it is preferable that the first injector 84 is used for implementing the normal control to limit the amplitude of the pressure variation to a small degree. The state of the above control is shown in FIG. 12.

During the low load operation, control (ON/OFF control) is implemented to inject the hydrogen gas for a predetermined ON time period at predetermined intervals (the intervals may not be extended) by the second injector 92. Thus, the anode differential pressure and the quantity of the injected hydrogen gas become large enough to discharge the stagnant water. At this time, in the first injector 84, in the stagnant water discharge mode, the OFF state may be maintained, and the quantity of the injected hydrogen gas may be decreased. That is, when the second injector 92 is driven, for the first injector 84, setting conditions of the drive cycle and the quantity of the hydrogen gas injected at every drive cycle are controlled to be equal to or less than setting conditions used in normal operation.

Therefore, the injection quantity of the hydrogen gas injected at every interval from the second injector 92 as the large flow rate device is increased. Thus, the anode differential pressure becomes large, and the desired performance for discharging the water can be obtained. Further, since the hydrogen gas is supplied from the second injector 92 having no ejector 86 on the downstream side, the anode differential pressure becomes large, and improvement in the performance of discharging the water is achieved.

Further, in the stagnant water discharge mode, as shown in FIG. 11, during a period in which the second injector 92 is turned on, the ON operation of the purge valve 72 is performed. Thus, in the second embodiment, the same advantages as in the case of the first embodiment are obtained. For example, the stagnant water remaining in the anode channel system of the fuel cell stack 12 can be discharged easily and reliably, and it becomes possible to maintain the desired power generation performance.

While the invention has been particularly shown and described with reference to preferred embodiments, it will be understood that variations and modifications can be effected thereto by those skilled in the art without departing from the scope of the invention as defined by the appended claims.

What is claimed is:

1. A method of controlling a fuel cell system, the fuel cell system comprising:
   a fuel cell having a cathode and an anode for generating electrical energy by electrochemical reactions of an oxygen-containing gas supplied to the cathode and a fuel gas supplied to the anode;
   an air pump for supplying the oxygen-containing gas to the fuel cell; and
   a fuel gas supply apparatus for supplying the fuel gas to the fuel cell, wherein the fuel gas supply apparatus includes:
   a fuel gas supply pipe for supplying the fuel gas to the anode of the fuel cell;
   a fuel gas discharge pipe for discharging the fuel gas from the anode of the fuel cell;
   a first injector provided in the fuel gas supply pipe;
   an ejector provided downstream of the first injector;
   a return pipe connected to the fuel gas discharge pipe and the ejector;
   a bypass pipe connected to the fuel gas supply pipe, bypassing the first injector and the ejector; and
   a second injector provided in the bypass pipe,
   wherein the first injector and the second injector have predetermined ON time periods at predetermined intervals, respectively,
   the method comprising:
   supplying the fuel gas to the anode of the fuel cell from the first injector at every drive cycle set based on a load operation of the fuel cell, the load operation comprising a first load operation and a second load operation lower than the first load operation, wherein the first injector is turned on during both load operations, and wherein the second injector is turned on during the first load operation;
   determining whether or not quantity of water content in the fuel cell is excessive by determining whether or not the quantity of water content is a predetermined quantity or more;
   when the quantity of the water content is determined as excessive and the fuel cell system is operating at the first load operation, setting a stagnant water discharge operation flag to initiate a stagnant water discharge mode of the fuel cell system;
   when the fuel cell system begins operating under the stagnant water discharge mode and operating at the first load operation, extending the interval of the second injector without changing the interval of the first injector;
   after operating at the first load operation, determining that the fuel cell has switched from operating at the first load operation to operating at the second load operation while the quantity of the water content remains excessive; and
   while the fuel cell system is operating under the stagnant water discharge mode and operating at the second load operation, setting the drive cycle of the first injector by switching operation of the first injector from a periodic on/off state to a steady off state, and maintaining the drive cycle of the second injector in a periodic on/off state.

2. The control method according to claim 1,
wherein the fuel gas supply apparatus includes a purge valve for purging the fuel gas discharged from the anode of the fuel cell, and
wherein when the fuel cell system is operating under the stagnant water discharge mode, the purge valve is opened temporarily while the fuel gas is injected by the first second injector at every set drive cycle.

3. The control method according to claim 1, wherein the flow rate of the fuel gas injected by the second injector is larger than the flow rate of the fuel gas injected by the first injector.

* * * * *